US012315656B1

(12) United States Patent
Wang et al.

(10) Patent No.: US 12,315,656 B1
(45) Date of Patent: May 27, 2025

(54) FLOATING PHOTOVOLTAIC CABLE MANUFACTURING DEVICE FOR OFFSHORE PHOTOVOLTAIC SYSTEMS AND MANUFACTURING METHOD THEREOF

(71) Applicant: SUNKEAN Cable Co., Ltd., Wuxi (CN)

(72) Inventors: Dongsheng Wang, Wuxi (CN); Yuanxiang Wang, Wuxi (CN); Qi Tang, Wuxi (CN)

(73) Assignee: SUNKEAN Cable Co., Ltd., Wuxi (CN)

( * ) Notice: Subject to any disclaimer, the term of this patent is extended or adjusted under 35 U.S.C. 154(b) by 0 days.

(21) Appl. No.: 19/008,915

(22) Filed: Jan. 3, 2025

(51) Int. Cl.
*H01B 13/26* (2006.01)
*H01B 7/12* (2006.01)
*H01B 7/22* (2006.01)

(52) U.S. Cl.
CPC ............ *H01B 13/264* (2013.01); *H01B 7/12* (2013.01); *H01B 7/226* (2013.01)

(58) Field of Classification Search
CPC ........ H01B 13/264; H01B 7/12; H01B 7/226; H01B 13/2633; H01B 13/026; H01B 13/00; H01B 7/26; B23P 19/008; B23P 19/04; B65H 54/44
See application file for complete search history.

(56) References Cited

FOREIGN PATENT DOCUMENTS

| | | | | | |
|---|---|---|---|---|---|
| BE | 863799 | A | * | 8/1978 | ............ H01B 13/26 |
| CN | 209792917 | U | | 12/2019 | |
| CN | 110767387 | A | * | 2/2020 | ......... H01B 13/0036 |
| CN | 113651181 | A | | 11/2021 | |
| CN | 216435552 | U | | 5/2022 | |
| CN | 116580903 | A | | 8/2023 | |

OTHER PUBLICATIONS

English translation of CN-110767387-A (Year: 2020).*
English translation of BE-863799-A (Year: 1978).*

* cited by examiner

*Primary Examiner* — Jun S Yoo
(74) *Attorney, Agent, or Firm* — Birchwood IP

(57) ABSTRACT

A floating photovoltaic cable manufacturing device for offshore photovoltaic systems and a manufacturing method thereof are provided. The device includes a cable body that passes through a rack at a constant speed, a winding frame is provided on one side of the rack, the winding frame is connected to a driving motor through a transmission mechanism, a rotation of the winding frame drives armored steel sheets to be wound on a surface of the cable body; a spot-welding gun provided in the rack through a regulation mechanism, a bottom of the spot-welding gun is aligned with the armored steel sheets; and a resistance band sleeved on surfaces of two sets of driving shafts, the resistance band is attached to the armored steel sheets, and a movement of the cable body enables the driving shafts to rotate on two sides of a connection rack.

5 Claims, 8 Drawing Sheets

FLOATING PHOTOVOLTAIC CABLE MANUFACTURING DEVICE FOR OFFSHORE PHOTOVOLTAIC SYSTEMS AND MANUFACTURING METHOD THEREOF

CROSS-REFERENCE TO RELATED APPLICATIONS

This application claims priority to Chinese Patent Application No. 202411004049.4, filed on Jul. 25, 2024, which is hereby incorporated by reference in its entirety.

TECHNICAL FIELD

The present disclosure relates to the field of cable manufacturing technologies, and in particular, to a floating photovoltaic cable manufacturing device for offshore photovoltaic systems and a manufacturing method thereof.

BACKGROUND

At present, the development of offshore photovoltaic systems is rapid. By setting up photovoltaic panels on sea surface and connecting them with photovoltaic cables to achieve a conversion of photovoltaic energy, it is an important development direction in the field of new energy. A difference between photovoltaic cables and ordinary cables is that the ordinary cables need to meet other effects such as signal transmission, but the photovoltaic cables only need to achieve energy transfer, which is similar wires. Currently, most photovoltaic cables used in such environments require an armor layer on the inner side of the cable to improve an overall corrosion resistance, sealing and stress resistance of a cable body. Therefore, the preparation process of photovoltaic cables and ordinary cables are different.

In the existing technology, there are obvious defects in the packaging process of photovoltaic cable armor. The armor is mostly made of steel sheets or steel wires, which are aligned and wound around the insulation layer on the inner side of the cable body. At specific positions, the armor needs to be cut and welded, which will lead to the loss of force on one side of the armor during normal processing (referring to situations where the armor tape is cut, or the length of the armor tape is insufficient). The armor wound around the surface of the cable body will loosen under the action of torsional force, resulting in armor failure and serious safety hazards. The traditional solution is to manually weld the gap position of the armor, which seriously wastes labor. Besides that, it is inconvenient and unsafe to operate.

Therefore, how to provide a floating photovoltaic cable manufacturing device for offshore photovoltaic systems and a manufacturing method are urgent problems that technical personnel in this field need to solve.

SUMMARY

An objective of the present disclosure is to propose a floating photovoltaic cable manufacturing device for offshore photovoltaic systems and a manufacturing method thereof.

The floating photovoltaic cable manufacturing device for offshore photovoltaic systems according to an embodiment of the present disclosure, including a cable body that passes through a rack at a constant speed; a winding frame is rotatably provided on one side of the rack that is close to a motion path of the cable body; the winding frame is connected to a driving motor through a transmission mechanism, a rotation of the winding frame drives armored steel sheets to be wound on a surface of the cable body;

a spot-welding gun, which is movably provided in the rack that is close to an upper of the cable body through a regulation mechanism; a bottom of the spot-welding gun is aligned with the armored steel sheets on the surface of the cable body; the regulation mechanism includes a four toothed belt assembly and a reciprocating component; a lower of the four toothed belt assembly is connected to an output shaft of the driving motor through a pulley, and a pulley side above the four toothed belt assembly is moved in an inner side of the rack through a shaft sleeve; the driving motor drives the reciprocating component to rotate at the inner side of the rack through the four toothed belt assembly; the reciprocating component includes a turntable and a pushing carriage; one side of the turntable is fixed with a convex block shaft, and the convex block shaft is slidably provided on an inner side of the pushing carriage, and the turntable is rotated to drive the pushing carriage to move up and down through the convex block shaft; one side of the pushing carriage is connected to the spot-welding gun through a shaft seat; two sides of the spot-welding gun are elastically connected to the shaft seat of the pushing carriage through a torsion spring; a connection sliding rod is fixed above the pushing carriage and is slidably connected to a stabilizing sliding rod; the connection sliding rod is limited to the stabilizing sliding rod through a pressing rack bolt; two sides of the stabilizing sliding rod are slid up and down in a sliding groove on the inner side of the rack; one side of the turntable is fixed with a limit sliding rod, and the limit sliding rod runs through an axial lead position of the four toothed belt assembly in a sliding manner, one side of the limit sliding rod is fixedly connected to a limit convex ring, one side of the limit convex ring is connected with a threaded adjustment rod; one side of the threaded adjustment rod is threaded connected to the rack through a tooth pattern; and a resistance band, sleeved on surfaces of two sets of driving shafts; the resistance band is attached to the armored steel sheets on two sides of the cable body, and a movement of the cable body enables the driving shafts to rotate on two sides of a connection rack.

In some embodiments of the present disclosure, a pressing rack mechanism is provided on surfaces of the armored steel sheets that are close to the spot-welding gun, shaft holes provided on two sides of the connection rack are movably connected to the driving shafts; one surface of the connection rack is elastically connected to the rack through a spring member; the resistance band is tightly attached to surfaces of the armored steel sheets through the spring member.

In some embodiments of the present disclosure, two sides of a single set of driving shafts are respectively connected to a belt transmission component; one side of the belt transmission component is connected to a rotation amount monitor through a belt wheel shaft.

In some embodiments of the present disclosure, one side of the rotation amount monitor is connected to an inner surface of the rack through a lateral sliding of an elastic slider, and the rotation amount monitor is electrically connected to the driving motor.

In some embodiments of the present disclosure, the transmission mechanism includes a main tooth, a secondary tooth, and a geared ring; the main tooth and the geared ring are respectively meshed with an upper side and a lower side of the secondary tooth; the main tooth is fixed with an output shaft of the driving motor, and the geared ring is provided on one side of the winding frame.

The manufacturing method of a floating photovoltaic cable for offshore photovoltaic systems includes the following steps:

S1: causing the cable body passing through the rack and an axial lead position of the winding frame at a constant speed, driving the driving motor to drive the winding frame to rotate on one side of the rack through a meshing transmission of the main tooth, the secondary tooth, and geared ring; at this time, the armored steel sheets on two sides of the winding frame wounding on the surface of the cable body to achieve a wounding;

S2: after the armored steel sheets wound around the surface of the cable body moving with the cable body to a position of the pressing rack mechanism, the resistance band is sleeved on surfaces of two sets of driving shafts, and the driving shafts are connected to each other through the connection rack; in this way, the spring member on a surface of the connection rack provides a downward pressure to the connection rack, driving the resistance band to be closely attached to the surfaces of the armored steel sheets; at this time, a continuous movement of the cable body drives the driving shafts to rotate by the resistance band, and a tight attaching of the resistance band to the armored steel sheets effectively prevents the armored steel sheets from loosening;

S3: during a process of driving the driving shafts to rotate, a rotation is transmitted to the rotation amount monitor through the belt transmission component on two sides of the driving shafts; the rotation amount monitor detects a rotation amount and determines actual movement speeds of the armored steel sheets on the surface of the cable body, and then feeds back a signal to the driving motor to control an actual rotation speed of the driving motor and prevents a situation where the armored steel sheets are stacked due to an excessive rotation speed of the driving motor;

S4: driving the winding frame to rotate, by the driving motor, and driving the limit sliding rod above the inner side of the rack to rotate through the four toothed belt assembly; one side of the limit sliding rod is fixed with the turntable, and the turntable is rotated to cause the convex block shaft on one side to rotate, the pushing carriage reciprocally moves up and down under a force, thereby causing the spot-welding gun to move up and down; at a specified position, the spot-welding gun is started to work, a welding point below the spot-welding gun is caused to contact with surface gaps of the armored steel sheets; at the same time, carrying out a spot welding operation during a movement process by the torsion spring and a rotation of the threaded adjustment rod, the threaded adjustment rod performing a thread movement and pushing the limit convex ring under a support of a movable connection of the limit convex ring, driving the spot-welding gun to move laterally by the reciprocating component so as to change the welding point position below the spot-welding gun, and the connection sliding rod is slid on the surface of the stabilizing sliding rod; after determining a position, tightening a bolt.

The beneficial effects of the present disclosure are as follows.

The present disclosure provides the four toothed belt assembly on the output shaft of the driving motor. When the driving motor drives the winding frame to rotate and wound the armored steel sheets on the surface of the cable body, and synchronously drives the spot-welding gun to move up and down by the reciprocating component. When the spot-welding gun contacts the surface gaps of the wounded armored steel sheets, a spot-welding performance can be achieved. At the same time, under an elastic torsion support of the torsion spring, a contact position between the spot-welding gun and the armored steel sheets can move laterally in a small range, thereby better adapting to the cable body in a motions state, greatly improving production efficiency and reducing labor output.

The present disclosure provides the limit sliding rod on one side of the turntable, and the limit sliding rod can undergo a limit sliding within the pulley above the four toothed belt assembly. When the threaded adjustment rod is twisted, one side of the threaded adjustment rod can effectively resist the limit sliding rod to move laterally, thereby pushing the reciprocating assembly and the spot-welding gun to move as a whole and changing the contact position between a lower of the spot-welding gun and the armored steel sheets. This is suitable for spot welding operations of armored steel sheets with different widths. A stable sliding effect of the stabilizing sliding rod stabilizes a movement effect of the spot-welding gun, further improving the spot-welding accuracy, so that the armored steel sheets can achieve better winding operation on the surface of the cable body and can prevent the armored steel sheets from disappearing in a middle after a force on one sides of the armored steel sheets has disappeared.

The present disclosure provides the pressing rack mechanism inside the rack that that is close to the spot-welding gun. The resistance band can be attached to the upper and lower sides of the armored steel sheets under two sets of driving shafts, and the connection rack is elastically connected to the rack through the spring member. In this way, the resistance band can be tightly attached to the armored steel sheets, thereby further preventing the armored steel sheets from loosening.

In the present disclosure, through providing the resistance band, not only enables the elastic effect of the spring member to achieve a tight fit between the resistance band and the armored steel sheets, but also the movement effect of the cable body can be achieved by the tight fit between the armored steel sheets and the resistance band, the resistance band is driven as a whole to move on the surface of the driving shaft, so that the driving shafts can be rotated. One sides of the driving shafts are connected to the rotation amount monitor through the belt transmission component, and the rotation amount monitor can monitor rotation speeds of the driving shafts in real time to control the driving motor or feedback an actual motion signal, so that the device as a whole has strong independence and can have high control and adjustment capabilities without relying on an assistance of other external devices.

BRIEF DESCRIPTION OF DRAWINGS

The accompanying drawings are used to provide further understanding of the present disclosure and form a part of this specification. They are used together with the embodiments of the present disclosure to explain the present disclosure and do not constitute limitations to the present disclosure.

Numeral reference: 1 rack; 2 cable body; 3 winding frame; 4 driving motor; 5 armored steel sheet; 6 transmission mechanism; 7 spot-welding gun; 8 regulation mechanism; 9 pressing rack mechanism; 61 main tooth; 62 secondary tooth; 63 geared ring; 81 four toothed belt assembly; 82 limit sliding rod; 83 reciprocating component; 84 torsion spring; 85 connection sliding rod; 86 stabilizing sliding rod; 87 threaded adjustment rod; 88 limit convex ring; 91 resistance band; 92 driving shaft; 93 connection rack; 94 spring member; 95 belt transmission component; 96 rotation amount monitor; 831 turntable; 832 convex block shaft; 833 pushing carriage.

DESCRIPTION OF EMBODIMENTS

Now, a further detailed explanation of the present disclosure will be provided in combination with the accompanying drawings. These drawings are simplified schematic diagrams that only illustrate the basic structure of the present disclosure in a schematic manner, and therefore only show the components related to the present disclosure.

Figure 1:
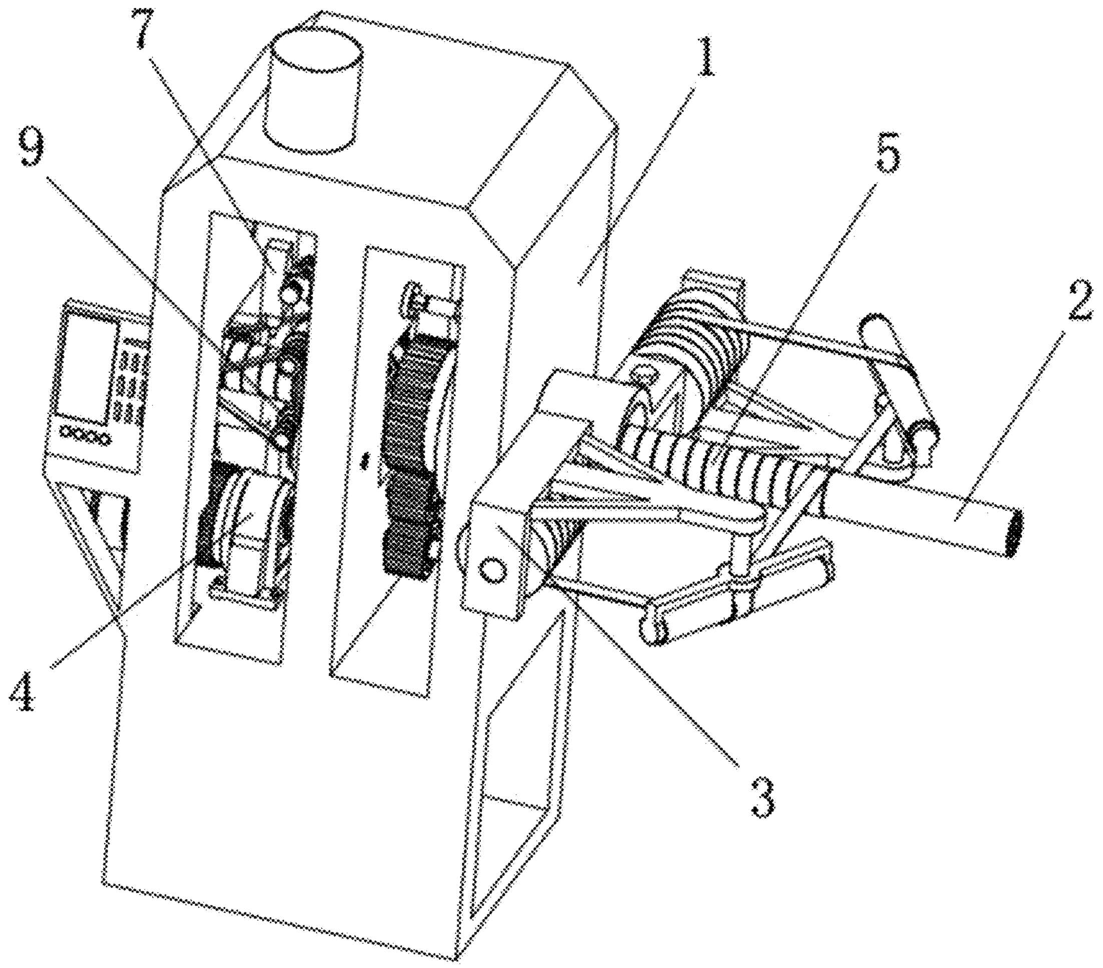
FIG. 1 is an overall schematic structural diagram of a floating photovoltaic cable manufacturing device for offshore photovoltaic systems of the present disclosure.
Figure 2:
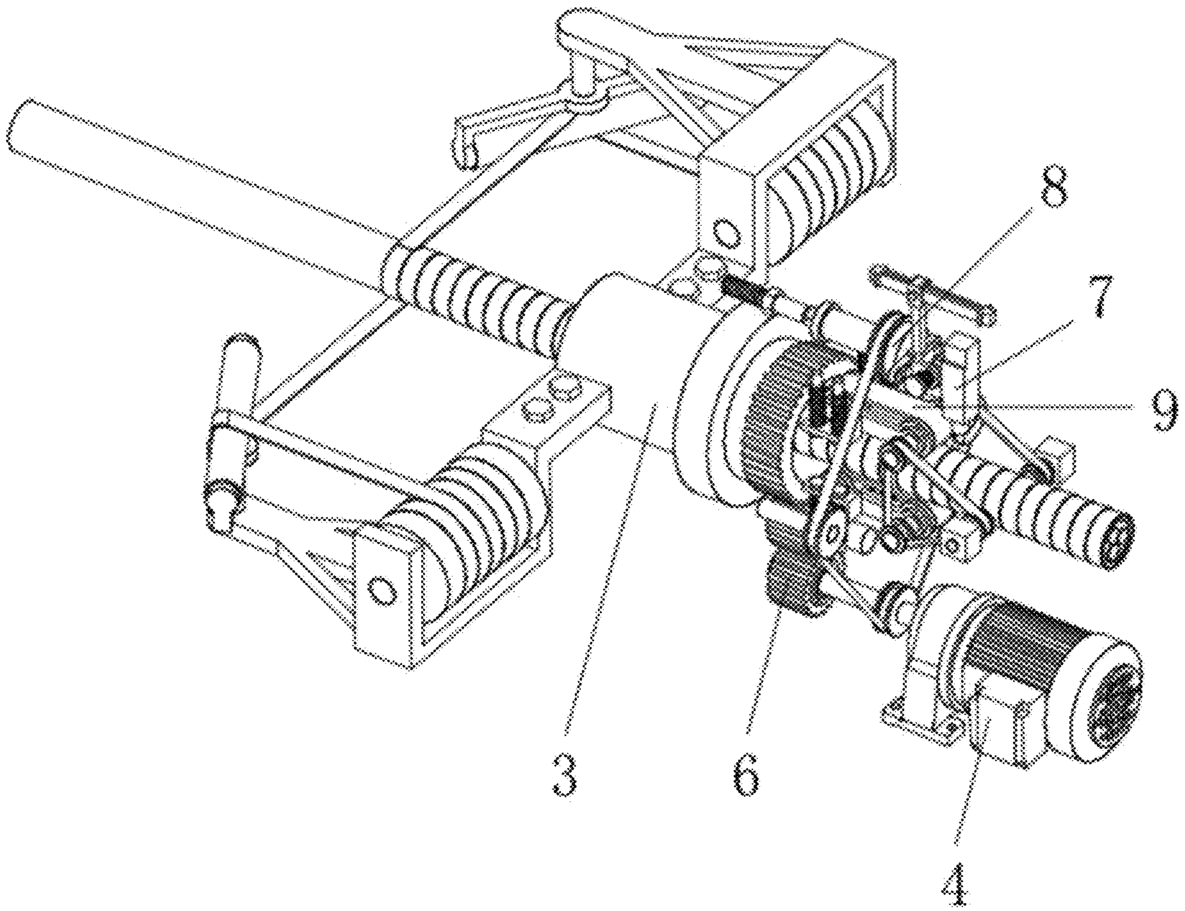
FIG. 2 is a schematic diagram of a transmission structure of a driving motor of the floating photovoltaic cable manufacturing device for offshore photovoltaic systems of the present disclosure.
Figure 3:
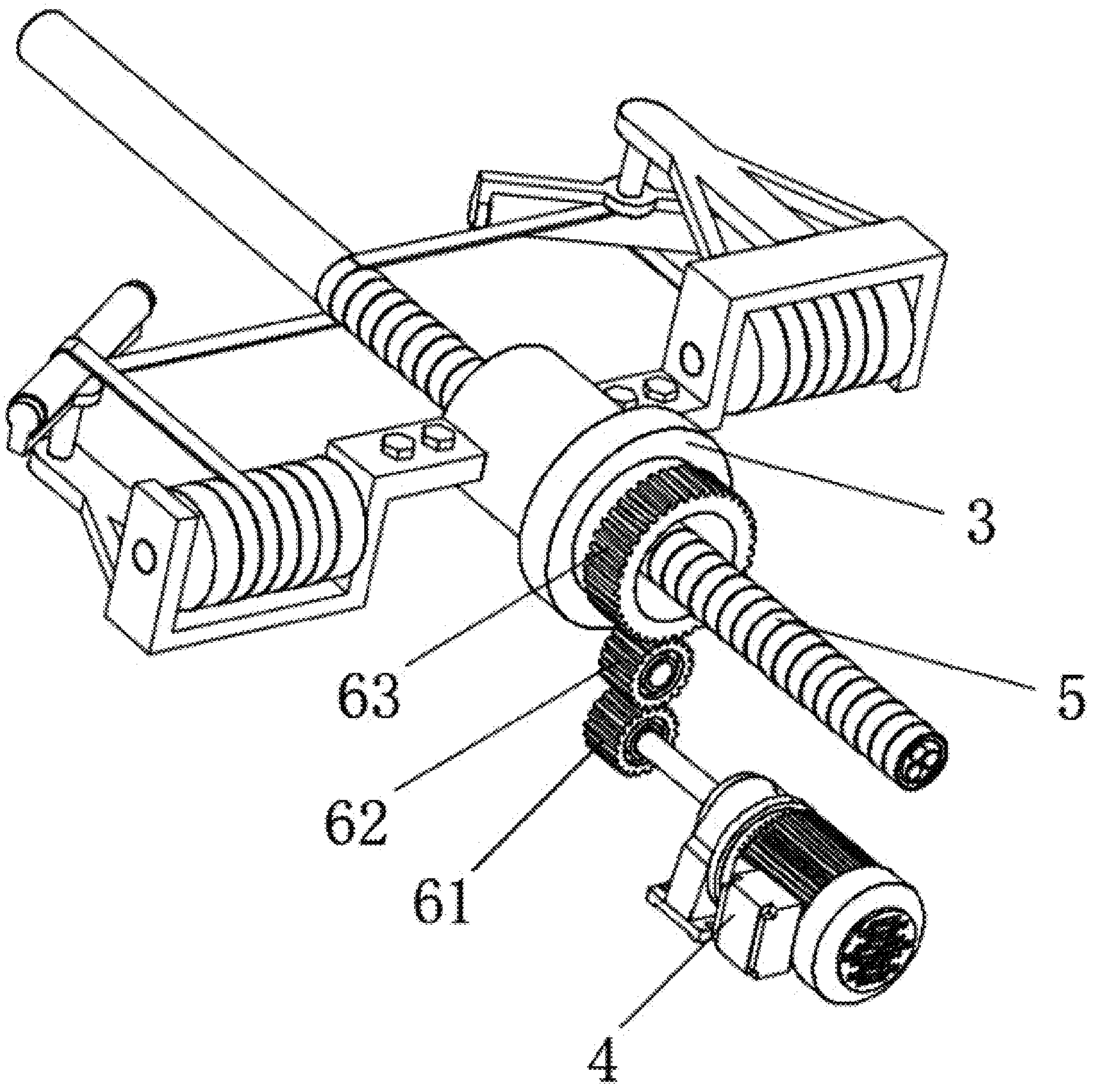
FIG. 3 is a connection structure of a transmission mechanism of the floating photovoltaic cable manufacturing device for offshore photovoltaic systems of the present disclosure.

Referring to FIGS. 1 and 2, a cable body 2 that passes through a rack 1 at a constant speed is included. A winding frame 3 is rotatably provided on one side of the rack 1 close to a motion path of the cable body 2, and the winding frame 3 is connected to a driving motor 4 through a transmission mechanism 6. A rotation of the winding frame 3 drives armored steel sheets 5 to be wound on a surface of the cable body 2.

A spot-welding gun 7, which is movably provided inside the rack 1 and close to an upper of the cable body 2 through a regulation mechanism 8. A bottom of the spot-welding gun is aligned to the armored steel sheets 5 on the surface of the cable body 2.

A resistance band 91 is sleeved on surfaces of two sets of driving shafts 92. The resistance band 91 is attached to the armored steel sheets 5 on an upper side and a lower side of the cable body 2, a movement of the cable body 2 enables the driving shafts 92 to rotate on two sides of a connection rack 93.

In this embodiment, the cable body 2 passes through an inner side of the rack 1 during an extrusion process, and the driving motor 4 under a driving state can drive the winding frame 3 to rotate through the transmission mechanism 6. The armored steel sheets 5 are respectively provided on two sides of the winding frame 3, and the armored steel sheets 5 are wound around the surface of the cable body 2. This can achieve a basic winding operation. At this time, there is a large torsional stress on the armored steel sheets 5. When the armored steel sheets 5 follow the cable body 2 to move to a position of the resistance band 91, the driving shafts 92 can effectively press upper sides and lower sides of the armored steel sheets 5, thereby reducing an existence of a torsional force. Then, the armored steel sheets 5 are moved to below the spot-welding gun 7, and under a transmission connection of the regulation mechanism 8 and the driving motor 4, the spot-welding gun 7 is driven to reciprocally move up and down inside the rack 1, thereby achieving a contact between a welding point below the spot-welding gun 7 and a gap position between armored steel sheets 5. Thus, a spot welding operation is realized, and the armored steel sheets 5 is prevented from loosening.

Figure 4:
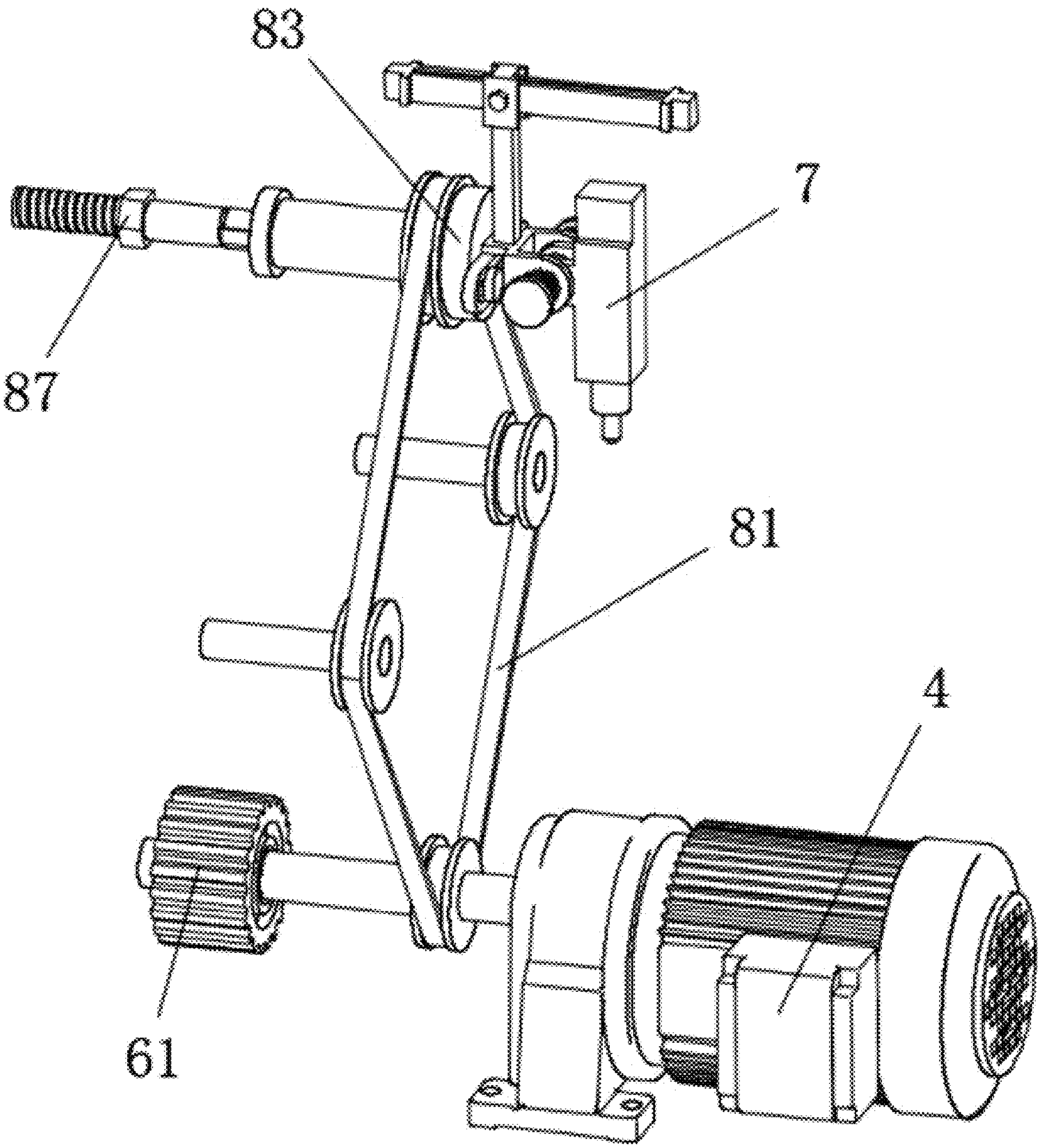
FIG. 4 is a connection structure of a regulation mechanism of the floating photovoltaic cable manufacturing device for offshore photovoltaic systems of the present disclosure.
Figure 7:
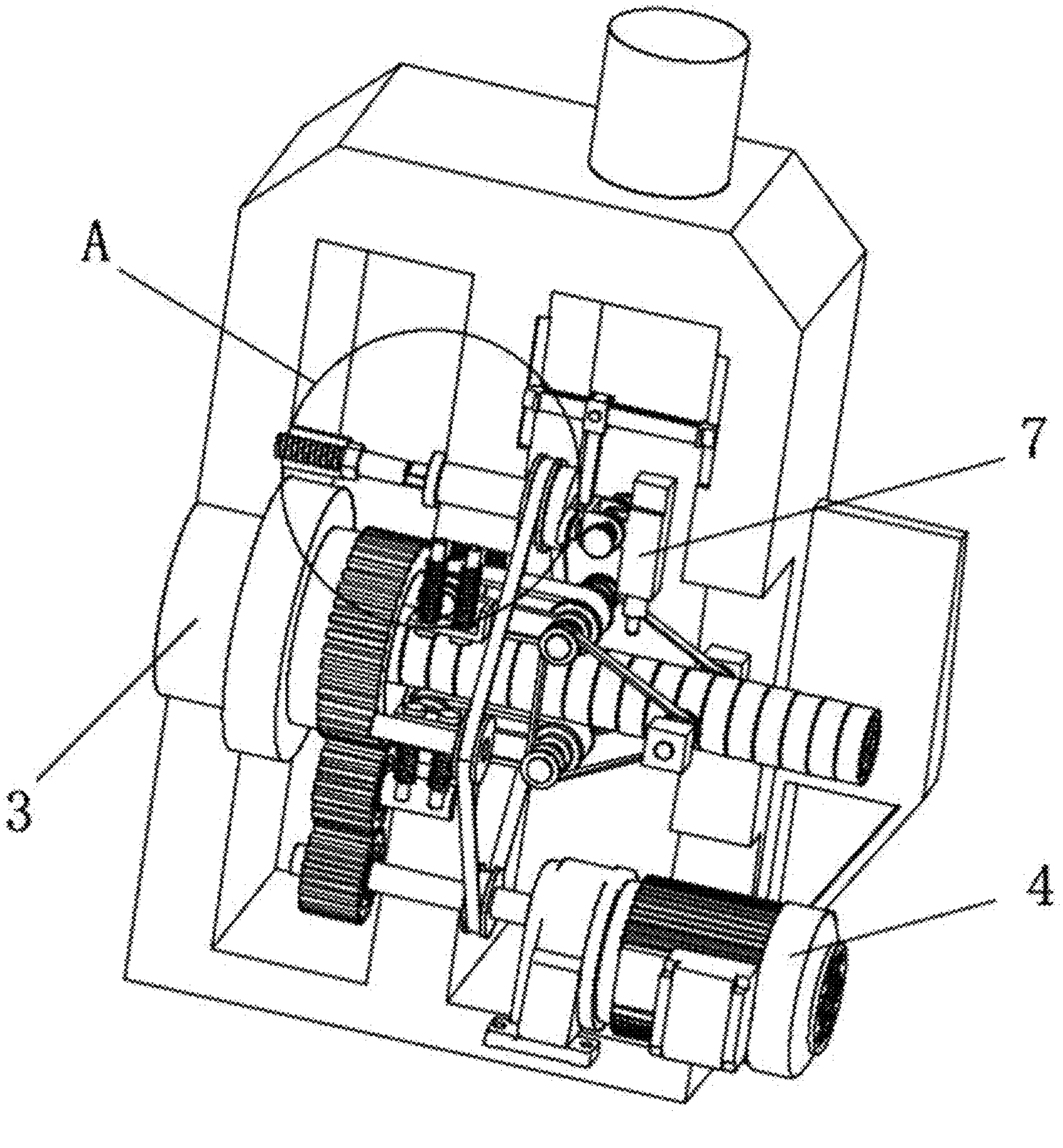
FIG. 7 is a semi sectional view of an internal structure of a rack of the floating photovoltaic cable manufacturing device for offshore photovoltaic systems of the present disclosure.

Referring to FIGS. 4 and 7, the regulation mechanism 8 includes a four toothed belt assembly 81 and a reciprocating component 83. A lower of the four toothed belt assembly 81 is connected to an output shaft of the driving motor 4 through a pulley. One side of the pulley above the four toothed belt assembly 81 is moved on the inner side of the rack 1 through a shaft sleeve. The driving motor 4 drives the reciprocating component 83 to rotate on the inner side of the rack 1 through the four toothed belt assembly 81.

In this embodiment, the four toothed belt assembly 81 refers to a belt transmission structure composed of four sets of pulleys and a toothed belt. A pressure wheel can also be provided on a surface of the toothed belt to improve a transmission effect. The pulley side above the four toothed belt assembly 81 is connected to the rack 1 through the shaft sleeve to achieve a movable limit and meet a connection operation of the subsequent limit sliding rod 82. In this way, a transmission effect of the driving motor 4 can effectively drive the reciprocating component 83 to rotate through the four toothed belt assembly 81, thereby realizing the operation of the spot-welding gun 7 reciprocally moving up and down.

Figure 5:
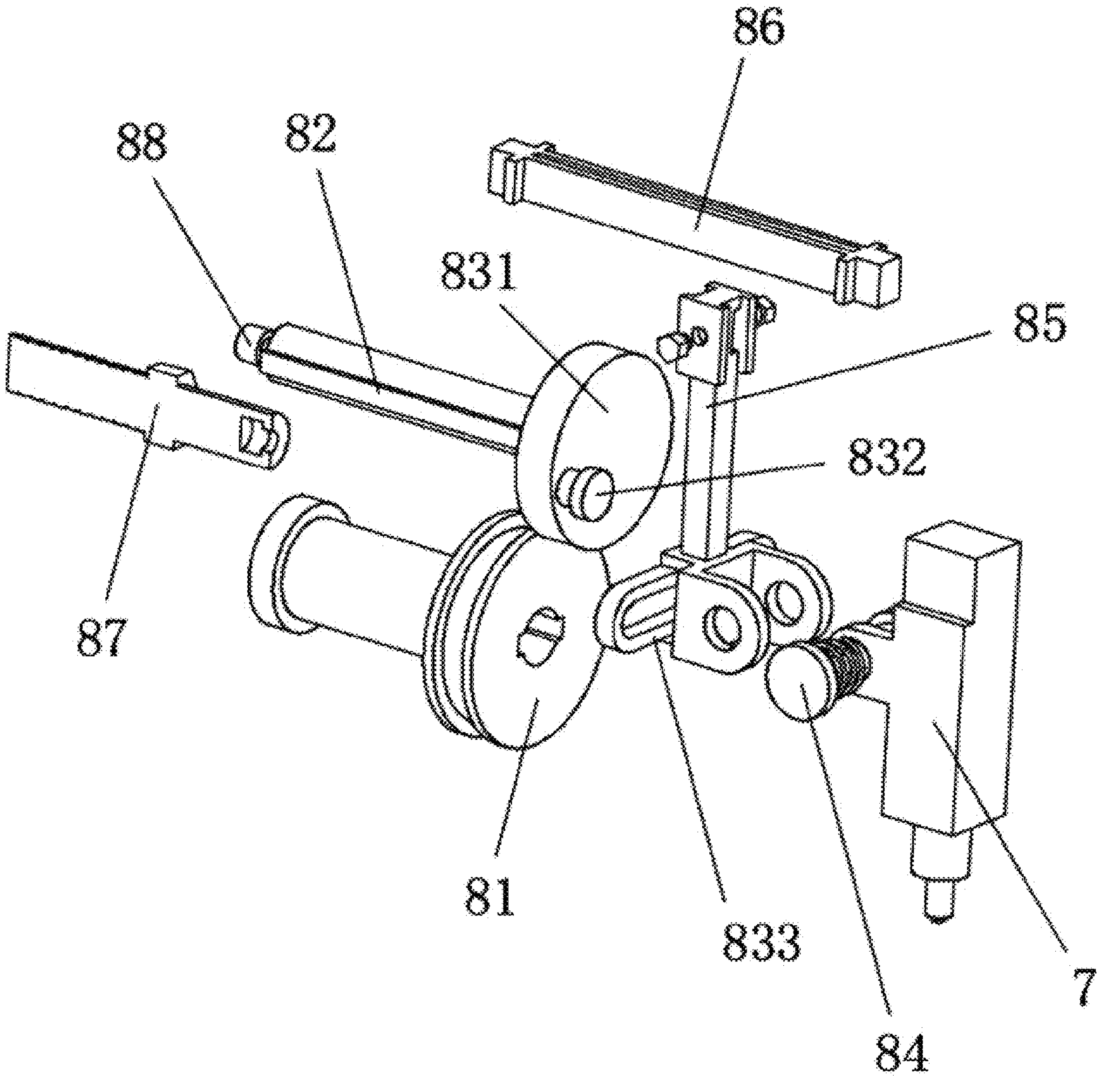
FIG. 5 is a disassembled diagram of the regulation mechanism of the floating photovoltaic cable manufacturing device for offshore photovoltaic systems of the present disclosure.
Figure 8:
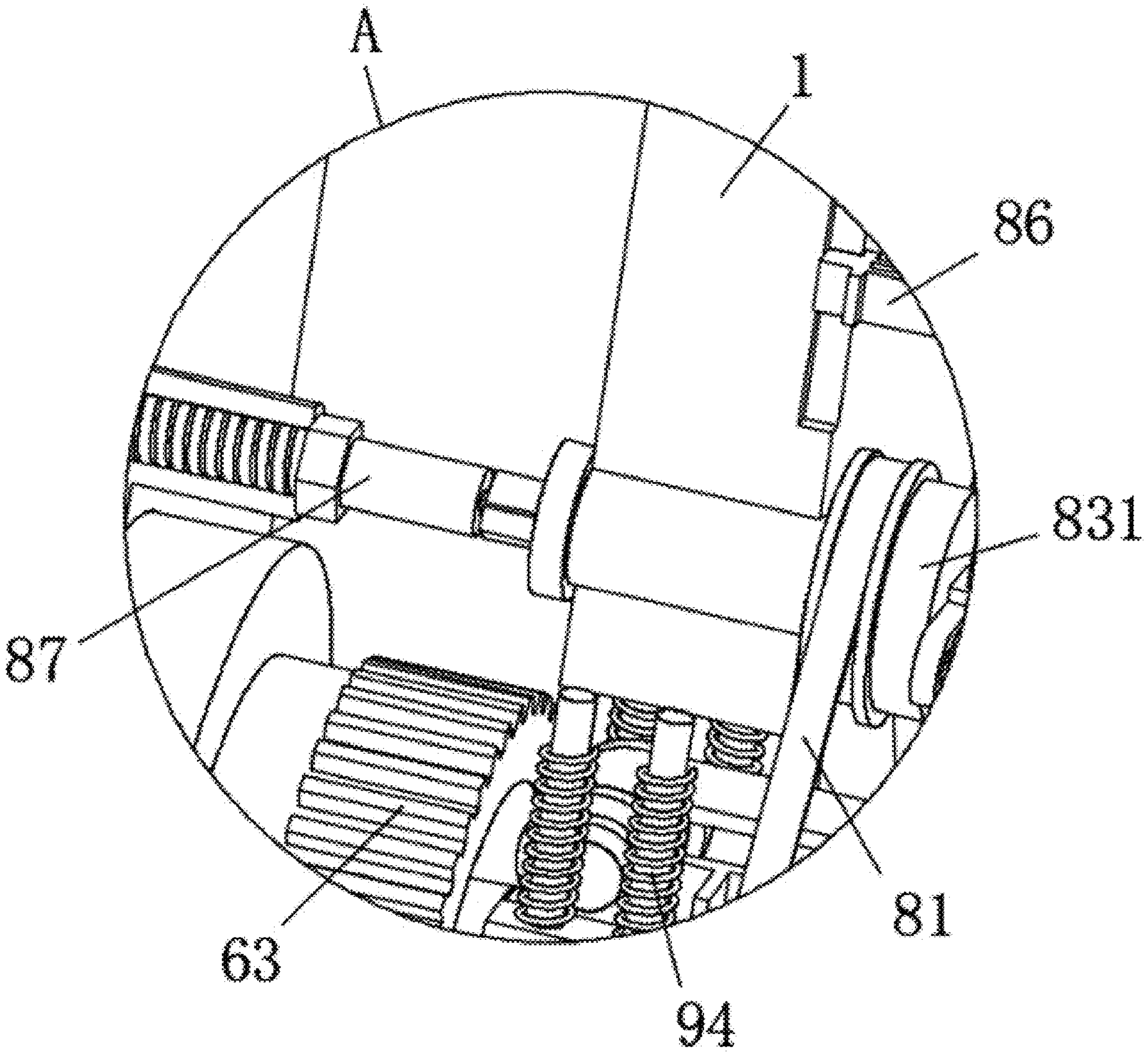
FIG. 8 is an enlarged structural view of point A in FIG. 7 of the floating photovoltaic cable manufacturing device for offshore photovoltaic systems of the present disclosure.

Referring to FIGS. 4, 5, and 8, the reciprocating component 83 includes a turntable 831 and a pushing carriage 833. One side of the turntable 831 is fixed with a convex block shaft 832, the convex block shaft 832 is slidably provided at an inner side of the pushing carriage 833. The turntable 831 is rotated and drives the pushing carriage 833 to move up and down through the convex block shaft 832. One side of the pushing carriage 833 is connected to the spot-welding gun 7 through a shaft seat, and two sides of the spot-welding gun 7 are elastically connected to the shaft seat of the pushing carriage 833 through a torsion spring 84. An upper of the pushing carriage 833 is provided with a connection sliding rod 85 that is slidably connected with a stabilizing sliding rod 86. The connection sliding rod 85 is limited to the stabilizing sliding rod 86 by a pressing rack bolt, and two sides of the stabilizing sliding rod 86 are sliding up and down in a sliding groove on the inner side of the rack 1.

In this embodiment, a rotation of the turntable 831 can synchronously drive the convex block shaft 832 to rotate, and there is a slidable connection between the convex block shaft 832 and the pushing carriage 833, so that the pushing carriage 833 can move up and down under force, thereby driving the connection sliding rod 85 and the spot-welding gun 7 to move up and down. When the bottom of the spot-welding gun 7 contacts gaps on surfaces of the armored steel sheets 5, a spot welding operation can be carried out so as to improve a connection stability of the armored steel sheets 5 and prevent the armored steel sheets 5 from loosening. The connecting slide rod 85 and the stabilizing sliding rod 86 are fixed by clamping bolts, and two sides of the stabilizing sliding rod 86 are also slidably provided on an inner surface of the rack 1, rendering the up and down movement of the spot-welding gun 7 to be more stable. And the spot-welding gun 7 is connected to one side of the pushing carriage 833 through the torsion spring 84, so that when the spot-welding gun 7 is rotated on the surface of the pushing carriage 833, the torsion spring 84 can provide an elastic torsion effect, allowing it to adapt to the cable body 2 in a motion state and meet spot welding operations with high efficiency.

Referring to FIGS. 4, 5, and 8, a limit sliding rod 82 is fixed on one side of the turntable 831, and the limit sliding rod 82 runs through an axial lead position of the four toothed belt assembly 81 in a sliding manner. One side of the limit sliding rod 82 is fixedly connected to a limit convex ring 88, one side of the limit convex ring 88 is rotatably connected to a threaded adjustment rod 87. One side of the threaded adjustment rod 87 is connected to the rack 1 through a tooth pattern.

In this embodiment, a connection between the limit sliding rod 82 and the shaft sleeve on one side of the four toothed belt assembly 81 is a sliding connection, and they maintain a spline connection between each other to meet a rotation transmission effect. One side of the limit sliding rod 82 is fixed with the limit convex ring 88, and the limit convex ring 88 can maintain a connection effect with the threaded adjustment rod 87 while meeting a rotation effect. In this way, when the threaded adjustment rod 87 is rotated, it can resist the limit sliding rod 82 to move to one side through the limit convex ring 88, thereby driving the reciprocating component 83 and the spot-welding gun 7 to move laterally, and changing a welding spot position below the spot-welding gun 7, so as to adapt to gap welding operations of the armored steel sheets 5 with different widths.

Figure 6:
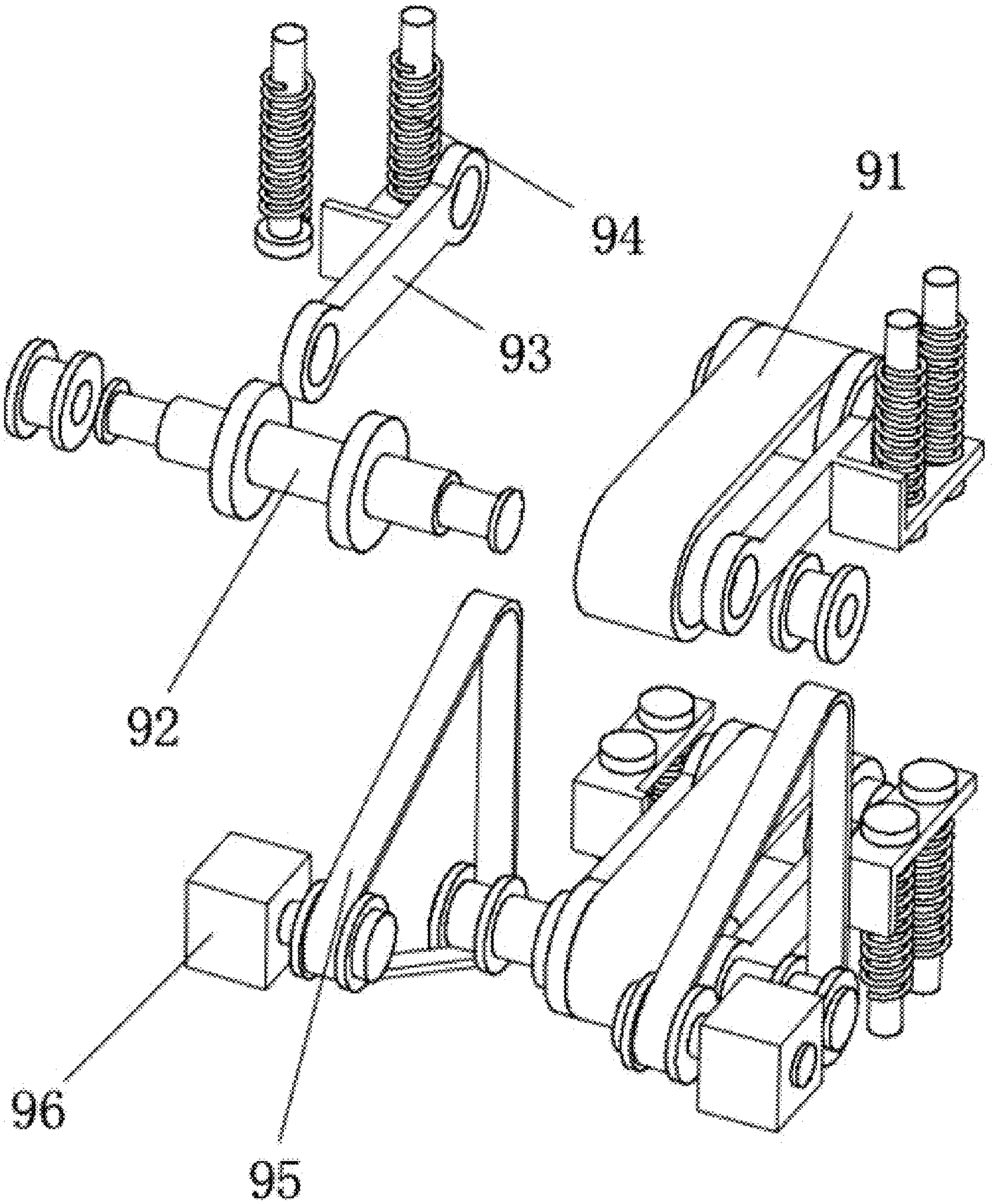
FIG. 6 is a disassembled diagram of a pressing rack mechanism of the floating photovoltaic cable manufacturing device for offshore photovoltaic systems of the present disclosure.

Referring to FIGS. 2, 6, and 8, a pressing rack mechanism 9 is provided on surfaces of the armored steel sheets 5 that are close to the spot-welding gun 7. Shaft holes provided on two sides of the connection rack 93 are movably connected to the driving shafts 92. One surface of the connection rack 93 is elastically connected to the rack 1 through a spring member 94, and the resistance band 91 is tightly attached to surfaces of the armored steel sheets 5 through the spring member 94. Two sides of a single set of driving shafts 92 are respectively connected to a belt transmission component 95, and one side of the belt transmission component 95 is connected to a rotation amount monitor 96 through a belt wheel shaft. The rotation amount monitor 96 is connected to the inner surface of the rack 1 through a lateral sliding of an elastic slider, and is electrically connected to the driving motor 4.

In this embodiment, the resistance band 91 is normally attached to the armored steel sheets 5 wound around the surface of the cable body 2, and the driving shafts 92 are provided at two ends of the inner side of the resistance band 91 to provide support for the resistance band 91. The driving shafts 92 are elastically connected to the rack 1 through the connection rack 93 and the spring member 94. In this way, the resistance band 91 can be elastically abutted against the surfaces of the armored steel sheets 5 so as to prevent the armored steel sheets 5 from loosening. When the cable body 2 drives the armored steel sheets 5 to move, the resistance band 91 will be synchronously driven, thereby realizing the rotations of the driving shafts 92. One sides of the driving shafts 92 are connected to the rotation amount monitor 96 through the belt transmission component 95, and the rotation amount monitor 96 monitors a movement speed of the resistance band 91 in a real time to control a rotation speed of the driving motor 4, rendering the device with highly independent and can be used independently without a need of an external device.

Referring to FIGS. 2, 6, and 8, the transmission mechanism 6 includes a main tooth 61, a secondary tooth 62, and a geared ring 63. The main tooth 61 and the geared ring 63 are respectively meshed on an upper side and a lower side of the secondary tooth 62. The main tooth 61 is fixed to an output shaft of the driving motor 4, and the geared ring 63 is provided on one side of the winding frame 3.

In this embodiment, a transmission connection effect of the main tooth 61, the secondary tooth 62, and the geared ring 63 enables the driving motor 4 to drive the winding frame 3 to flip on one side of the rack 1, thereby achieving winding operations of the armored steel sheets 5 on the surface of the cable body 2.

A manufacturing method of a floating photovoltaic cable for offshore photovoltaic systems, includes the follows steps:

S1: causing the cable body 2 passing through the rack 1 and an axial lead position of the winding frame 3 at a constant speed, driving the driving motor 4 to drive the winding frame 3 to rotate on one side of the rack 1 through a meshing transmission of the main tooth 61, the secondary tooth 62, and geared ring 63; at this time, the armored steel sheets 5 on two sides of the winding frame 3 wounding on the surface of the cable body 2 to achieve a wounding;

S2: after the armored steel sheets 5 wound around the surface of the cable body 2 moving with the cable body 2 to a position of the pressing rack mechanism 9, the resistance band 91 is sleeved on surfaces of two sets of driving shafts 92, and the driving shafts are 92 connected to each other through the connection rack 93; in this way, the spring member 94 on a surface of the connection rack 93 provides a downward pressure to the connection rack 93, driving the resistance band 91 to be closely attached to the surfaces of the armored steel sheets 5; at this time, a continuous movement of the cable body 2 drives the driving shafts 92 to rotate by the resistance band 91, and a tight attaching of the resistance band to the armored steel sheets 5 effectively prevents the armored steel sheets 5 from loosening;

S3: during a process of driving the driving shafts 92 to rotate, a rotation is transmitted to the rotation amount monitor 96 through the belt transmission component 95 on two sides of the driving shafts; the rotation amount monitor 96 detects a rotation amount and determines actual movement speeds of the armored steel sheets 5 on the surface of the cable body 2, and then feeds back a signal to the driving motor 4 to control an actual rotation speed of the driving motor 4 and prevents a situation where the armored steel sheets 5 are stacked due to an excessive rotation speed of the driving motor 4;

S4: driving the winding frame 3 to rotate, by the driving motor 4, and driving the limit sliding rod 82 above the inner side of the rack 1 to rotate through the four toothed belt assembly 81; one side of the limit sliding rod 82 is fixed with the turntable 831, and the turntable

831 is rotated to cause the convex block shaft 832 on one side to rotate, the pushing carriage 833 reciprocally moves up and down under a force, thereby causing the spot-welding gun 7 to move up and down; at a specified position, the spot-welding gun 7 is started to work, a welding point below the spot-welding gun 7 is caused to contact with surface gaps of the armored steel sheets 5; at the same time, carrying out a spot welding operation during a movement process by the torsion spring and a rotation of the threaded adjustment rod 87, the threaded adjustment rod performing a thread movement and pushing the limit convex ring 88 under a support of a movable connection of the limit convex ring 88, driving the spot-welding gun 7 to move laterally by the reciprocating component 83 so as to change the welding point position below the spot-welding gun 7, and the connection sliding rod 85 is slid on the surface of the stabilizing sliding rod 86; after determining a position, tightening a bolt.

Working principle: firstly, during an extrusion process, the cable body 2 passes through the rack 1 and a center position the winding frame 3. Under a driving state of the driving motor 4, the winding frame 3 can be driven to rotate by a transmission effect of the main tooth 61, the secondary tooth 62, and the geared ring 63 in the transmission mechanism 6. The armored steel sheets 5 on two sides of the winding frame 3 perform armor covering operation on the surface of the cable body 2 during a rotation process. When the armored steel sheets 5 wound on the surface of the cable body 2 pass through a position of the resistance band 91 in the pressing rack mechanism 9, the resistance band 91 is elastically connected to the spring member 94 through the driving shafts 92 and the connection rack 93, so that the resistance band 91 has an elastic pressure, thereby better compressing the surfaces of the armored steel sheets 5 and preventing the armored steel sheets 5 from loosening, and at the same time, the armored steel sheets 5 are moved with the cable body 2 to drive the resistance band 91 to move. In this rotating state, the driving shafts 92 can transmit the rotation effect to the rotation amount monitor 96 through the belt transmission component 95. The rotation amount monitor 96 monitors the rotation amount in real time, thereby controlling the rotation speed of the driving motor 4 and improving the independence of the device. Then, the armored steel sheets 5 are moved below the spot-welding gun 7. At this time, the driving motor 4 drives the limit sliding rod 82 to rotate through the four toothed belt assembly 81 in the regulation mechanism 8. One side of the limit sliding rod 82 is directly connected to the turntable 831. In this rotating state, the turntable 831 can effectively drive the convex block shaft 832 to rotate, the pushing carriage 833 moves up and down under force and drives the spot-welding gun 7 to move up and down until the spot-welding gun 7 contacts the surface gaps on the armored steel sheets 5, thereby achieving a spot welding. At the same time, under a twisting connection of the torsion spring 84, the spot-welding gun 7 can be rotated in a small range so as to facilitate movement operations of the armored steel sheets 5, and the threaded adjustment rod 87 is rotated. The threaded adjustment rod 87 moves laterally inside the rack 1, and under the connection of the limit convex ring 88, the limit sliding rod 82 is displaced and resists the reciprocating component 83 and the spot-welding gun 7 to move as a whole. At the same time, the connection sliding rod 85 moves on the surface of the stabilizing sliding rod 86. After reaching a specified position, the connection sliding rod 85 is fixed to the stabilizing sliding rod 86 by a pressing rack bolt, so that the spot-welding gun 7 can be spot welded with armored steel sheets 5 having different widths, with strong adaptability.

The above is only preferred specific implementation modes of the present disclosure, but the protection scope of the present disclosure is not limited to this. Any technical personnel familiar with this technical field who, within the scope of the technology disclosed in the present disclosure, make equivalent substitutions or changes based on the technical solution and inventive concept of the present disclosure should be included in the protection scope of the present disclosure.

What is claimed is:

1. A floating photovoltaic cable manufacturing device for offshore photovoltaic systems, comprising:

a cable body that passes through a rack at a constant speed; a winding frame is rotatably provided on one side of the rack that is close to a motion path of the cable body; the winding frame is connected to a driving motor through a transmission mechanism, a rotation of the winding frame drives armored steel sheets to be wound on a surface of the cable body;

a spot-welding gun, which is movably provided in the rack that is close to an upper of the cable body through a regulation mechanism; a bottom of the spot-welding gun is aligned with the armored steel sheets on the surface of the cable body; the regulation mechanism comprises a four toothed belt assembly and a reciprocating component; a lower of the four toothed belt assembly is connected to an output shaft of the driving motor through a pulley, and a pulley side above the four toothed belt assembly is moved in an inner side of the rack through a shaft sleeve; the driving motor drives the reciprocating component to rotate at the inner side of the rack through the four toothed belt assembly; the reciprocating component comprises a turntable and a pushing carriage; one side of the turntable is fixed with a convex block shaft, and the convex block shaft is slidably provided on an inner side of the pushing carriage; the turntable is rotated to drive the pushing carriage to move up and down through the convex block shaft; one side of the pushing carriage is connected to the spot-welding gun through a shaft seat; two sides of the spot-welding gun are elastically connected to the shaft seat of the pushing carriage through a torsion spring; a connection sliding rod is fixed above the pushing carriage and is slidably connected to a stabilizing sliding rod; the connection sliding rod is limited to the stabilizing sliding rod through a pressing rack bolt; two sides of the stabilizing sliding rod are slid up and down in a sliding groove on the inner side of the rack; one side of the turntable is fixed with a limit sliding rod, and the limit sliding rod runs through an axial lead position of the four toothed belt assembly in a sliding manner, one side of the limit sliding rod is fixedly connected to a limit convex ring, one side of the limit convex ring is connected with a threaded adjustment rod; one side of the threaded adjustment rod is threaded connected to the rack through a tooth pattern; and a resistance band, sleeved on surfaces of two sets of driving shafts; the resistance band is attached to the armored steel sheets on two sides of the cable body, and a movement of the cable body enables the driving shafts to rotate on two sides of a connection rack.

2. The floating photovoltaic cable manufacturing device for offshore photovoltaic systems according to claim 1, wherein a pressing rack mechanism is provided on surfaces of the armored steel sheets that are close to the spot-welding gun, shaft holes provided on the two sides of the connection rack are movably connected to the driving shafts;

one surface of the connection rack is elastically connected to the rack through a spring member;

the resistance band is tightly attached to surfaces of the armored steel sheets through the spring member.

3. The floating photovoltaic cable manufacturing device for offshore photovoltaic systems according to claim 2, wherein two sides of a single set of driving shafts are respectively connected to a belt transmission component;

one side of the belt transmission component is connected to a rotation amount monitor through a belt wheel shaft.

4. The floating photovoltaic cable manufacturing device for offshore photovoltaic systems according to claim 3, wherein one side of the rotation amount monitor is connected to an inner surface of the rack through a lateral sliding of an elastic slider, and the rotation amount monitor is electrically connected to the driving motor.

5. The floating photovoltaic cable manufacturing device for offshore photovoltaic systems according to claim 4, wherein the transmission mechanism comprises a main tooth, a secondary tooth, and a geared ring;

the main tooth and the geared ring are respectively meshed with an upper side and a lower side of the secondary tooth;

the main tooth is fixed with the output shaft of the driving motor, and the geared ring is provided on one side of the winding frame.

* * * * *